(12) United States Patent
Rogahn et al.

(10) Patent No.: US 7,906,244 B2
(45) Date of Patent: Mar. 15, 2011

(54) HOMOGENOUS THERMAL COOLANT CYCLING IN FUEL CELL STACK

(75) Inventors: Aaron Rogahn, Honeoye, NY (US); Stephen Farris, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1192 days.

(21) Appl. No.: 11/053,633

(22) Filed: Feb. 8, 2005

(65) Prior Publication Data

US 2006/0177707 A1 Aug. 10, 2006

(51) Int. Cl.
*H01M 8/04* (2006.01)

(52) U.S. Cl. .......................... 429/442; 429/433; 429/434

(58) Field of Classification Search .................... 429/13, 429/12, 26, 23, 433, 434, 442
See application file for complete search history.

(56) References Cited

U.S. PATENT DOCUMENTS

2005/0175875 A1* 8/2005 Nelson et al. .................. 429/26
2005/0282050 A1* 12/2005 Zanoni et al. .................. 429/26

* cited by examiner

*Primary Examiner* — Dah-Wei D Yuan
*Assistant Examiner* — Zachary Best
(74) *Attorney, Agent, or Firm* — Reising Ethington P.C.

(57) ABSTRACT

An internal coolant circulation system and method of homogenizing waste heat in a fuel cell stack using homogenous thermal coolant cycling is disclosed. The method includes operating a fuel cell stack, distributing a coolant through the fuel cell stack, terminating operation of the fuel cell stack, retaining the coolant in the fuel cell stack and circulating the coolant throughout the fuel cell stack.

6 Claims, 1 Drawing Sheet

HOMOGENOUS THERMAL COOLANT CYCLING IN FUEL CELL STACK

FIELD OF THE INVENTION

The present invention relates to cooling systems for fuel cells. More particularly, the present invention relates to a homogenous thermal coolant cycling system and method for maintaining heat distribution in a fuel cell stack to decrease the time required to warm the stack on start-up and mitigate the formation of hot spots in the stack.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

Fuel cells include three components: a cathode, an anode and an electrolyte which is sandwiched between the cathode and the anode and passes only protons. Each electrode is coated on one side by a catalyst. In operation, the catalyst on the anode splits hydrogen into electrons and protons. The electrons are distributed as electric current from the anode, through a drive motor and then to the cathode, whereas the protons migrate from the anode, through the electrolyte to the cathode. The catalyst on the cathode combines the protons with electrons returning from the drive motor and oxygen from the air to form water. Individual fuel cells can be stacked together in series to generate increasingly larger quantities of electricity.

While they are a promising development in automotive technology, fuel cells are characterized by a high operating temperature which presents a significant design challenge from the standpoint of maintaining the structural and operational integrity of the fuel cell stack. Maintaining the fuel cell stack within the temperature ranges that are required for optimum fuel cell operation depends on a highly-efficient cooling system which is suitable for the purpose.

During startup of a PEM (polymer electrolyte membrane) fuel cell, the faster a fuel cell stack is able to reach operating temperatures, the better the performance of the fuel cell. Due to localized heating of the MEA (membrane electrode assembly) resulting from the electro-chemical reaction of hydrogen and oxygen, adequate removal of heat from the MEA is required. Previous methods of terminating operation of the coolant pump have proven to help heat up the stack at a faster rate; however, because the coolant in the stack is stationary, hot spots tend to occur in the fuel cell stack. Over time, these hot spots turn into pinholes, which ultimately render the stack non-functional.

The design operating temperature for a fuel cell stack is typically in the 65~80 degrees C. range. During a cold start from a temperature of 5 degrees C., fuel cell stack waste heat is utilized to rapidly bring the temperature of the stack up to its design operating temperature. When the design operating temperature is reached, a coolant pump is started for rejecting waste heat and preventing temperature overshoot.

It is important that the coolant pump not start too early since this will cause the desired operating temperature not to be reached or to be delayed. However, it has been discovered that coolant will circulate even if the coolant pump is not in operation, especially if the stack is started in cold weather. This is due to the difference in density between hot and cold coolant. When coolant is heated in the stack, it rises into the coolant manifold because it is lighter than the relatively cold coolant in the coolant system piping. The colder coolant, in turn, falls back down into the stack by gravity. This rising of the warm coolant and falling of the cold coolant in the system causes a "Ferris wheel" effect in which warm coolant flows freely from the stack to the system piping and cold coolant flows from the system piping into the stack.

Accordingly, a system and method is needed to circulate coolant within a stack during start-up of the fuel cell in order to retain waste heat in the stack and expedite attainment of the stack to operating temperatures. The circulated coolant maintains homogeneity in temperature among all regions of the stack, thus eliminating or reducing the formation of hot spots in the stack.

SUMMARY OF THE INVENTION

The present invention is generally directed to a novel internal coolant circulation system and method for warming a fuel cell stack to operating temperatures in a short period of time. The internal coolant circulation system includes a coolant circulation loop which is provided inside the fuel cell stack and circulates only the volume of coolant contained in the stack during start-up of the fuel cell. Internal circulation of the stack coolant retains waste heat in the stack and expedites attainment of the stack to operating temperatures. Furthermore, the circulated coolant maintains homogeneity in temperature among all regions of the stack, thus eliminating or reducing the formation of hot spots in the stack.

BRIEF DESCRIPTION OF THE DRAWINGS

The invention will now be described, by way of example, with reference to the accompanying drawings, in which.

DETAILED DESCRIPTION OF THE INVENTION

Figure 1:
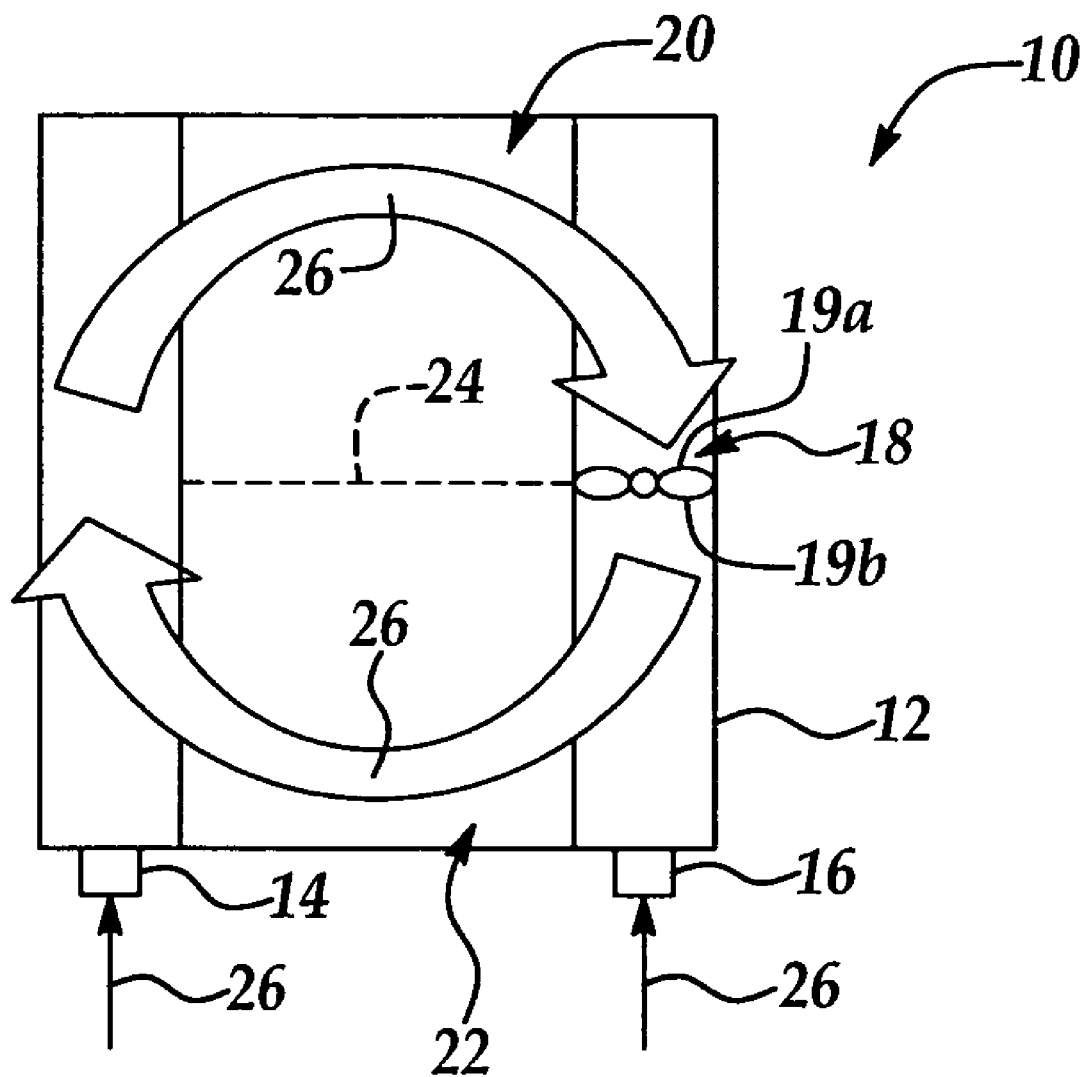
FIG. 1 is a schematic view of an internal coolant circulation system according to the present invention.

Referring to FIG. 1, an illustrative embodiment of an internal coolant circulation system according to the present invention is generally indicated by reference numeral 10. By using the Homogenous Thermal Coolant Cycling (HTCC) concept, the internal coolant circulation system 10 is designed to circulate coolant 26 throughout a PEM (polymer electrolyte membrane) fuel cell stack 12 in order to retain waste heat in the fuel cell stack 12 and rapidly warm the fuel cell stack 12 to operating temperatures upon initial start-up of the fuel cell stack 12. The fuel cell stack 12 includes a coolant inlet 14 for receiving the coolant 26 and a coolant outlet 16 for discharging the coolant 26 from the fuel cell stack 12.

The internal coolant circulation system 10 includes a coolant circulating mechanism 18, such as a small pump, for example, which is placed in the fuel cell stack 12 typically on the coolant outlet side of the fuel cell stack 12. The coolant circulating mechanism 18 is aligned with an imaginary line 24 which divides the fuel cell stack 12 into a low pressure region 20 and a high pressure region 22. Accordingly, the low-pressure region 20 is on the inlet side 19a of the coolant circulating mechanism 18, whereas the high-pressure region 22 is on the outlet side 19b of the coolant circulating mechanism 18.

During operation of the fuel cell stack 12, a coolant pump (not shown) which is exterior to the fuel cell stack 12 pumps the coolant 26 through a radiator (not shown), in which thermal energy from the coolant 26 is dissipated to air flowing through the radiator. The coolant 26 leaves the radiator and enters the fuel cell stack 12 through the coolant inlet 14. As the coolant 26 is distributed throughout the fuel cell stack 12, heat generated by the fuel cell stack 12 is absorbed by the coolant 26, which then leaves the fuel cell stack 12 through the coolant outlet 16 and is again pumped through the radiator.

Upon subsequent shutdown of the fuel stack 12, the coolant pump stops pumping coolant 26 through the fuel cell stack 12. Accordingly, some of the coolant 26 remains in the fuel cell stack 12. The coolant 26 which remains in the fuel cell stack 12 is initially hot due to the waste heat generated by the fuel cell stack 12, but gradually cools non-uniformly such that some portions of the coolant 26 remain warm while other portions of the coolant 26 become cool. The coolant 26 remaining in the fuel cell stack 12 therefore contains portions of both warm and cool coolant 26.

Upon subsequent start-up of the fuel cell stack 12, the coolant inlet 14 and coolant outlet 16 are closed to prevent flow of coolant 26 into and out of the fuel cell stack 12. The coolant circulation mechanism 18 is operated to draw coolant 26 through the inlet side 19a and out the outlet side 19b of the coolant circulation mechanism 18. Consequently, within the fuel cell stack 12, the coolant 26 circulates in a circular motion as it continually flows from the outlet side 19b of the coolant circulation mechanism 18; through the high pressure region 22 and low pressure region 20, respectively, of the fuel cell stack 12; and back to the inlet side 19a of the coolant circulation mechanism 18. This causes mixing of the warm and cold portions of the coolant 26, thus raising the temperature of the fuel cell stack 12 and providing a substantially uniform temperature distribution of the coolant 26 throughout the fuel cell stack 12. As a result, the initial temperature is closer to the operating temperature (typically in the 65~80 degrees C. range) of the fuel cell stack 12, and this decreases the amount of time necessary for the fuel cell stack 12 to reach normal operating temperatures. Furthermore, due to the homogeneity of the temperature in the fuel cell stack 12, the formation of "hot spots" in the fuel cell stack 12 is eliminated or substantially reduced. This increases the lifetime of the fuel cell stack 12.

While the preferred embodiments of the invention have been described above, it will be recognized and understood that various modifications can be made in the invention and the appended claims are intended to cover all such modifications which may fall within the spirit and scope of the invention.

What is claimed is:

1. A method of homogenizing waste heat in a fuel cell stack, comprising:

providing a fuel cell stack having an internal coolant circulation loop that distributes coolant between a coolant inlet and a coolant outlet, and providing a coolant circulating mechanism placed in said stack and located in said internal coolant circulation loop and between said coolant inlet and said coolant outlet for circulating coolant internally within said fuel cell stack and within said internal coolant circulation loop;

operating said fuel cell stack;

distributing a coolant through said fuel cell stack and through said internal coolant circulation loop, at least some of said coolant entering said fuel cell stack externally of said fuel cell stack through said coolant inlet;

terminating operation of said fuel cell stack;

retaining an amount of said coolant in said fuel cell stack and in said internal coolant circulation loop by closing said coolant inlet and closing said coolant outlet in order to prevent flow of coolant into and out of said fuel cell stack; and using said coolant circulating mechanism to circulate said amount of retained coolant internally within said fuel cell stack and within said internal coolant circulation loop upon start-up and while said coolant inlet and coolant outlet remain closed.

2. The method of claim 1 wherein said circulating said coolant throughout said fuel cell stack comprises circulating said coolant throughout said fuel cell stack during start-up of said fuel cell stack.

3. The method of claim 1 wherein said circulating said coolant throughout said fuel cell stack comprises generating a low pressure region and a high pressure region in said fuel cell stack and circulating said coolant from said high pressure region to said low pressure region.

4. The method of claim 1 wherein said providing a coolant circulating mechanism in said fuel cell stack comprises providing said coolant circulation mechanism at an imaginary line dividing said fuel cell stack into a high-pressure region and a low-pressure region.

5. The method of claim 1 wherein said coolant circulating mechanism comprises a pump.

6. The method of claim 1 wherein said circulating said coolant throughout said fuel cell stack comprises generating a low pressure region and a high pressure region in said fuel cell stack on inlet and outlet sides, respectively, of said coolant circulating mechanism and circulating said coolant from said high pressure region to said low pressure region.

* * * * *